United States Patent
Yamada

(10) Patent No.: US 8,551,902 B2
(45) Date of Patent: Oct. 8, 2013

(54) METHOD FOR MANUFACTURING CATALYST LAYER AND METHOD FOR MANUFACTURING MEMBRANE ELECTRODE ASSEMBLY

(75) Inventor: Kazuhiro Yamada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 657 days.

(21) Appl. No.: 12/470,366

(22) Filed: May 21, 2009

(65) Prior Publication Data

US 2009/0291842 A1    Nov. 26, 2009

(30) Foreign Application Priority Data

May 23, 2008    (JP) .................... 2008-135690

(51) Int. Cl.
  *H01M 4/88*    (2006.01)
  *B01J 21/00*   (2006.01)

(52) U.S. Cl.
  USPC .......................................... 502/101; 502/262

(58) Field of Classification Search
  USPC ................................. 502/100–104
  See application file for complete search history.

(56) References Cited

U.S. PATENT DOCUMENTS

| | | | | |
|---|---|---|---|---|
| 4,746,693 A | * | 5/1988 | Meder | 524/306 |
| 4,979,973 A | * | 12/1990 | Takita et al. | 65/17.6 |
| 5,523,181 A | | 6/1996 | Stonehart et al. | |
| 7,897,650 B2 | * | 3/2011 | Sayre et al. | 521/25 |
| 2005/0123862 A1 | * | 6/2005 | Pugliano et al. | 430/321 |
| 2007/0134544 A1 | * | 6/2007 | Yamada et al. | 429/44 |
| 2007/0224486 A1 | * | 9/2007 | Ueda et al. | 429/38 |

FOREIGN PATENT DOCUMENTS

JP    2006-332041 A    12/2006

OTHER PUBLICATIONS

Aelion et al "Hydrolysis of Ethyl Silicate", J. Am. Chem. Soc. 1950, 72 (12), 5705-5712.*
Pawlowski et al, "Alkoxy and Aryloxy Siloxane Oils and Resins", Przemysl Chem., 1956, 12, 687-693.*

* cited by examiner

*Primary Examiner* — Bijay Saha
(74) *Attorney, Agent, or Firm* — Canon U.S.A. Inc., IP Division

(57) ABSTRACT

A method for manufacturing a catalyst layer that has good long-term water resistance and a method for manufacturing a membrane electrode assembly. The method for manufacturing a catalyst layer includes the processes of: (1) attaching an Si compound comprising Si, —OH bound to the Si or a group that is bound to the Si and becomes —OH upon hydrolysis, and a hydrophobic group to a surface of a catalyst precursor layer comprising at least platinum oxide; (2) attaching a mixture comprising a metal compound having a metal atom and —OH bound to the metal atom or a group that is bound to the metal atom and becomes —OH upon hydrolysis and a proton conductive polymer electrolyte to the surface of the catalyst precursor layer to which the Si compound has been attached; and (3) reducing the catalyst precursor layer to which the mixture has been attached.

9 Claims, 5 Drawing Sheets

METHOD FOR MANUFACTURING CATALYST LAYER AND METHOD FOR MANUFACTURING MEMBRANE ELECTRODE ASSEMBLY

BACKGROUND OF THE INVENTION

1. Field of the Invention

The present invention relates to a method for manufacturing a catalyst layer and a method for manufacturing a membrane electrode assembly.

2. Description of the Related Art

Japanese Patent Laid-Open No. 2006-332041 describes a method by which an Si compound having a hydrophobic substituent that generates a polymerizable group in a hydrolysis reaction induced by a catalytic action of platinum oxide is brought into contact with a structural body composed of porous platinum oxide and the platinum oxide is thereafter reduced. A hydrophobizing agent including methylsiloxane or the like can thus be easily added to a catalyst layer.

However, long-term water resistance of the porous catalyst layer described in Japanese Patent Laid-Open No. 2006-332041 is hardly sufficient and further improvement is desired.

SUMMARY OF THE INVENTION

Accordingly, the present invention provides a method for manufacturing a catalyst layer that has good long-term water resistance and a method for manufacturing a membrane electrode assembly.

The first aspect of the present invention relates to a method for manufacturing a catalyst layer, including the processes of:

(1) attaching an Si compound including Si, —OH bound to the Si or a group that is bound to the Si and becomes —OH upon hydrolysis, and a hydrophobic group to a surface of a catalyst precursor layer including at least platinum oxide;

(2) attaching a mixture including a metal compound having a metal atom and —OH bound to the metal atom or a group that is bound to the metal atom and becomes —OH upon hydrolysis and a proton conductive polymer electrolyte to the surface of the catalyst precursor layer to which the Si compound has been attached; and (3) reducing the catalyst precursor layer to which the mixture has been attached.

Another aspect of the present invention relates to a method for manufacturing a membrane electrode assembly including, in addition to the processes (1) to (3), a process of transferring or joining the catalyst precursor layer to which the mixture has been attached to a surface of a polymer electrolyte membrane after the process (2) and before the process (3), or after the process (3).

Yet another aspect of the present invention relates to a method for manufacturing a catalyst layer, including the processes of:

(i) attaching an Si compound including Si, —OH bound to the Si or a group that is bound to the Si and becomes —OH upon hydrolysis, and a hydrophobic group to a surface of a catalyst precursor layer including at least platinum oxide;

(ii) reducing the catalyst precursor layer and obtaining a catalyst structural body (a); and (iii) attaching a mixture including a metal compound having a metal atom and —OH bound to the metal atom or a group that is bound to the metal atom and becomes —OH upon hydrolysis and a proton conductive polymer electrolyte to the surface of the catalyst structural body (a).

Still another aspect of the present invention relates to a method for manufacturing a membrane electrode assembly including, in addition to the processes (i) to (iii), a process of transferring or joining the catalyst precursor layer to which the mixture has been attached to a surface of a polymer electrolyte membrane after the process (iii).

Further features of the present invention will become apparent from the following description of exemplary embodiments with reference to the attached drawings.

DETAILED DESCRIPTION OF THE INVENTION

An example of preferred embodiment of the present invention will be described below with reference to the appended drawings. In the explanation below, a case in which a fuel cell is a solid polymer fuel cell will be described by way of example.

First, a configuration of a solid polymer fuel cell of a unit cell structure will be described.

Figure 1:
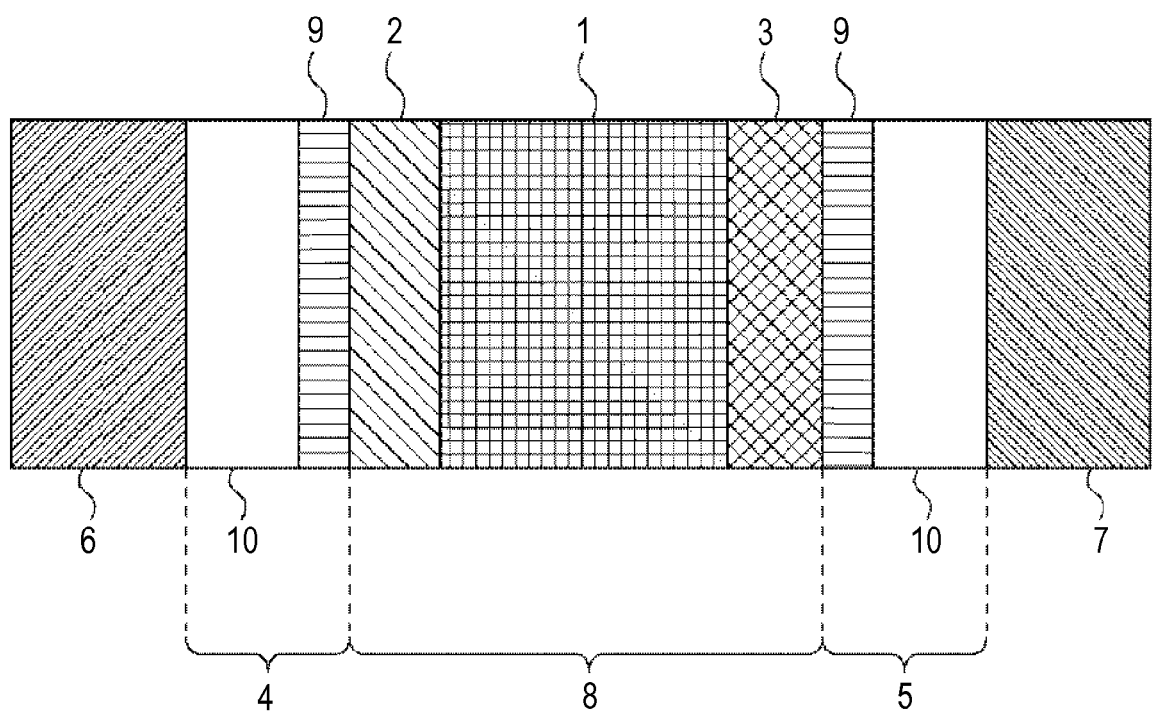
FIG. 1 is a schematic diagram illustrating a solid polymer fuel cell unit.

FIG. 1 is a schematic diagram illustrating a cross-sectional configuration of a solid polymer fuel cell of a unit cell structure. In FIG. 1, the reference numeral 1 stands for a solid polymer electrolyte membrane. A pair of catalyst layers (that is, an anode catalyst layer 2 and a cathode catalyst layer 3) are disposed so as to sandwich the solid polymer electrolyte membrane 1. An anode-side cathode diffusion layer 4 is disposed adjacently to the anode catalyst layer 2, and a cathode-side gas diffusion layer 5 is disposed adjacently to the cathode catalyst layer 3. An anode-side collector 6 and a cathode-side collector 7 are disposed adjacently to the anode-side cathode diffusion layer 4 and the cathode-side gas diffusion layer 5, respectively. The reference numeral 8 stands for a membrane electrode assembly in which the anode catalyst layer 2 and cathode catalyst layer 3 are disposed on two main surfaces of the solid polymer electrolyte membrane 1. The two main surfaces of the solid polymer electrolyte membrane 1, as referred to herein, are the surfaces with the largest area, from among the pairs of opposing surfaces of the solid polymer electrolyte membrane 1.

The solid polymer electrolyte membrane 1 is a polymer electrolyte membrane having a function of transmitting protons ($H^+$) generated at the anode side to the cathode side and is composed of a polymer compound having a proton conductive group. Examples of the polymer electrolyte membrane include perfluorocarbon polymers having a sulfonate group, such as NAFION™ (Du Pont Co.), sulfonated or phosphated aromatic polyether ketones, and polysulfones.

The anode catalyst layer 2 and cathode catalyst layer 3 have a function of a reaction field for a fuel cell reaction. The catalyst layer obtained in accordance with the present invention may be used either for the anode catalyst layer 2 or for the cathode catalyst layer 3, or both for the anode catalyst layer 2 and the cathode catalyst layer 3. However, from the standpoint of facilitating the accumulation of the generated water, it is preferred that the catalyst layer obtained in accordance with the present invention be used at least for the cathode catalyst layer 3. Where the catalyst layer obtained in accordance with the present invention is used either for the anode catalyst layer 2 or for the cathode catalyst layer 3, platinum black or platinum-supporting carbon can be used as the other catalyst layer.

The anode-side gas diffusion layer 4 and the cathode-side gas diffusion layer 5 serve to supply oxygen or fuel to the membrane electrode assembly 8. The anode-side gas diffusion layer 4 and the cathode-side gas diffusion layer 5 are preferably configured by a plurality of sub-layers. Where they are configured by a plurality of sub-layers, it is preferred that those sub-layers of the anode-side gas diffusion layer 4 and the cathode-side gas diffusion layer 5 that are in contact with the membrane electrode assembly 8 have an average size of pores less than other sub-layers. More specifically, in a case where the gas diffusion layers are configured by two sub-layers, as shown in FIG. 1, it is preferred that an average diameter of pores in sub-layers 9, which come into contact with the membrane electrode assembly 8, from among the sub-layers of the anode-side gas diffusion layer 4 and the cathode-side gas diffusion layer 5, be less than an average diameter of pores in other sub-layers 10 constituting the anode-side gas diffusion layer 4 and the cathode-side gas diffusion layer 5.

In a case where those sub-layers of the anode-side gas diffusion layer 4 and the cathode-side gas diffusion layer 5 that are in contact with the membrane electrode assembly 8 have an average size of pores less than other sub-layers, these sub-layers that are in contact with the membrane electrode assembly 8 will be hereinbelow sometimes called microporous layers (MPL).

For example, a layer including carbon microparticles and using PTFE as a binder can be used as the MPL. Examples of the carbon microparticles include acetylene black, Ketjen black, fibrous carbon formed by vapor-phase growth, and carbon nanotubes.

A carbon cloth, carbon paper, and porous metals can be used for portions other than the MPL among the sub-layers constituting the anode-side gas diffusion layer 4 and cathode-side gas diffusion layer 5. Therefore, the anode-side gas diffusion layer 4 and cathode-side gas diffusion layer 5 can be used as gas diffusion layers having a structure composed of two or more sub-layers obtained by laminating the aforementioned layers and combining with MPL. In a case where a metal material is used for sub-layers, a material that excels in oxidation resistance is preferred. Specific examples of preferred materials include SUS 316L, nickel-chromium alloys, and titanium. For example, CELMET™ (manufactured by Toyama Sumitomo Denko KK) can be used as the porous nickel chromium alloy. Any of the aforementioned materials may be also covered with gold.

The anode-side collector 6 and cathode-side collector 7 are formed from an electrically conductive material such as a metal or carbon and have a function of taking the electrons generated by the fuel cell reaction to the outside. Therefore, the collectors 6 and 7 are disposed in contact with the anode-side gas diffusion layer 4 and cathode-side gas diffusion layer 5 and have terminals for taking the output to the outside. Examples of materials for the collectors include titanium, carbon, stainless steel (SUS), SUS coated with gold, SUS coated with carbon, aluminum coated with gold, and aluminum coated with carbon.

A fuel cell in which a plurality of unit cells produced in the above-described manner are stacked can be produced.

Figure 2:
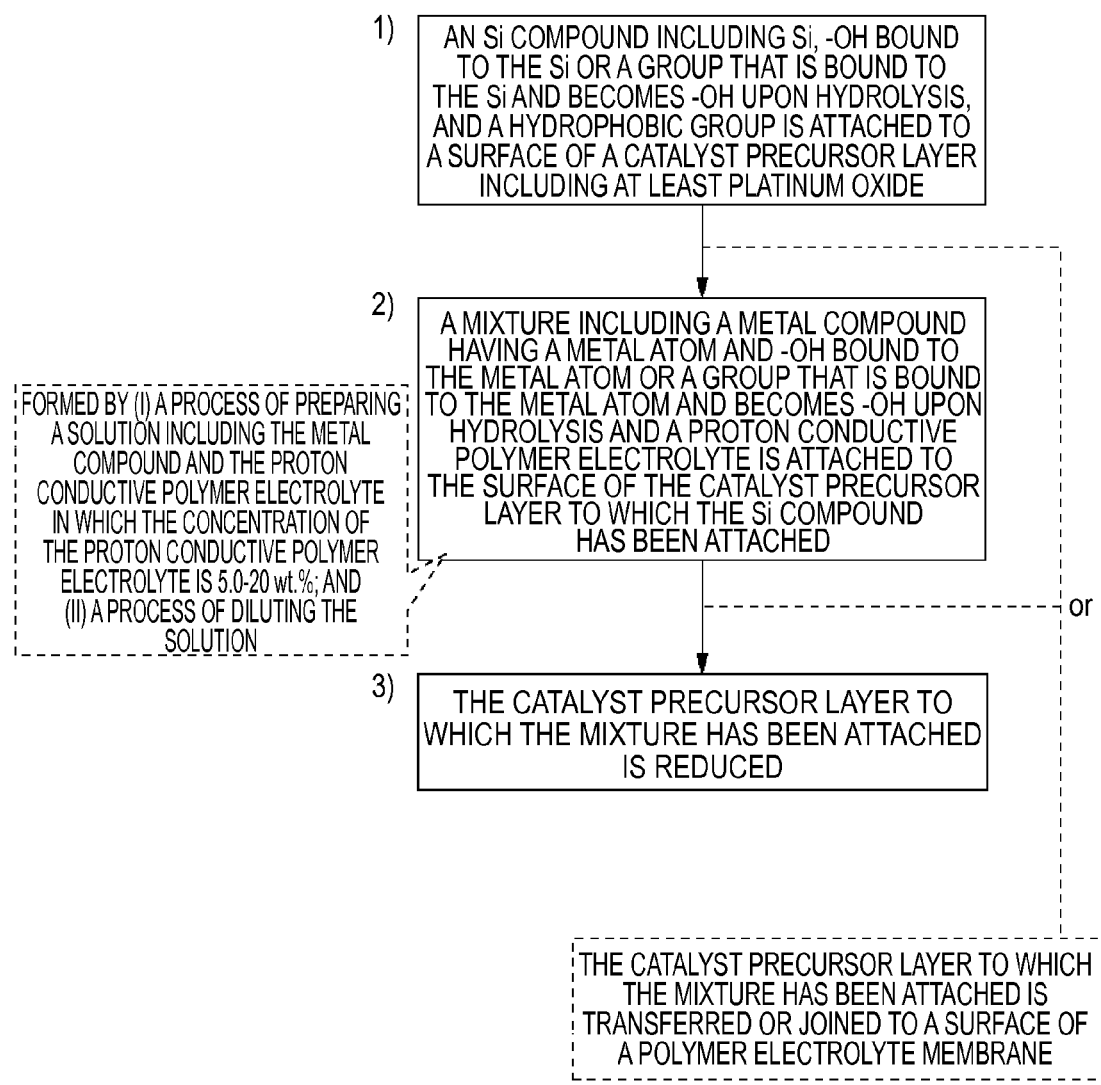
FIG. 2 is a flowchart illustrating the first aspect of the present invention.

The first aspect of the present invention will be described below. A flowchart illustrating the first aspect of the present invention is shown in FIG. 2.

The first aspect of the present invention relates to a method for manufacturing a catalyst layer, including the processes of:

(1) attaching an Si compound including Si, —OH bound to the Si or a group that is bound to the Si and becomes —OH upon hydrolysis, and a hydrophobic group to a surface of a catalyst precursor layer including at least platinum oxide;

(2) attaching a mixture including a metal compound having a metal atom and —OH bound to the metal atom or a group that is bound to the metal atom and becomes —OH upon hydrolysis and a proton conductive polymer electrolyte to the surface of the catalyst precursor layer to which the Si compound has been attached; and (3) reducing the catalyst precursor layer to which the mixture has been attached.

The aforementioned processes will be described below.

First, the process (1) will be described.

In the process (1), the catalyst precursor including at least platinum oxide is preferably a porous body including at least platinum oxide and more preferably has a dendritic shape. The "dendritic shape" as referred to herein means a structure in which rod-shaped or flake-shaped configurations are collected in branching points. Where a cross-section of a catalyst layer having a dendritic shape obtained by the below-described process (3) is observed under an electron microscope or the like, a tree-like configuration can be observed in which a plurality of rod-shaped structural bodies or flake-shaped structural bodies are collected as branches. One rod-shaped or flake-shaped structure preferably has a length in the short side direction thereof of equal to or greater than 5 nm and equal to or less than 200 nm. The length in the short side direction as referred to herein means a minimum dimension of one rod-shaped structural body or flake-shaped structural body in a virtual projection plane.

As for platinum oxide having a dendritic shape, for example, a feature disclosed in Japanese Patent Laid-Open No. 2006-49278 can be applied to the present invention.

Platinum oxide can be represented by $PtO_X$. A range of X in this case is preferably equal to or more than 2, but in a case where the platinum oxide has a dendritic shape, the upper limit of X can be actually considered as 2.5.

In a case where a catalyst precursor layer including at least platinum oxide is formed, it is preferred that a sputtering method such as reactive sputtering or a reactive vapor-phase method such as a reactive ion plating method be used. When the catalyst precursor layer is formed, film formation conditions (film formation pressure, RF power applied to the target, and oxygen partial pressure during film formation) are appropriately adjusted so as to obtain an O/Pt ratio satisfying the above-described condition.

The catalyst precursor layer may be formed on a substrate and then transferred to a polymer electrolyte membrane surface, or a gas diffusion layer may be formed and then the gas diffusion layer and the catalyst precursor layer may be joined to the polymer electrolyte membrane surface. Also, the catalyst precursor layer may be formed on the polymer electrolyte membrane surface.

Where the catalyst precursor layer is formed on a substrate and then transferred to the polymer electrolyte membrane surface to form a membrane electrode assembly, the transfer process is preferably carried out after the below-described process (2) and before the process (3), or after the process (3). This is because where the transfer process is carried out after the process (2), the proton conductive polymer electrolyte added in the process (2) effectively increases adhesion between the polymer electrolyte membrane and the catalyst precursor layer. In a case where the catalyst precursor layer is transferred to the polymer electrolyte membrane surface, joining is preferably performed in addition to the transferring.

In a case where the transfer to the polymer electrolyte membrane surface is performed after the formation on a substrate, the joining is preferably performed by hot pressing in a state in which the catalyst layer is brought into contact with the surface of the solid polymer electrolyte membrane. In this case, the hot pressing is performed under the conditions such that cause no peeling between the catalyst layer and the polymer electrolyte membrane. More specifically, the hot pressing is preferably performed at a temperature of 130° C. to 150° C., a pressurization time of 1 min to 30 min, and a pressure of 1 MPa to 40 MPa. In a case where the transfer is carried out, the transfer substrate is peeled off after the catalyst layer and the solid polymer electrolyte membrane have been brought into contact with each other. In a case where the hot pressing is performed, it is preferred that a material with a heat resistance of equal to or higher than 130° C. be used for the substrate. This is because where a substrate made from a material with a heat resistance equal to or higher than 130° C. is used, when the hot pressing is carried out after the transfer, the hot pressing can be carried out at a temperature equal to or higher than a glass transition temperature of the proton conductive polymer electrolyte (130° C. for NAFION™). Furthermore, where a material with high heat resistance is used, damage to the substrate during vapor-phase film growth can be prevented.

For example, a resin sheet with high heat resistance such as PTFE, a polycarbonate, and a polyimide can be used as such a material. When a polycarbonate or polyimide is used, the sheet preferably has a multilayer structure and a parting layer composed of a fluororesin or a fluorosilane is preferably formed on the film formation surface of the catalyst layer.

In a case where the gas diffusion layer having the catalyst precursor layer formed thereon is joined to the polymer electrolyte membrane surface, it is also preferred that the joining process be carried out after the process (2) and before the process (3), or after the process (3). Where the gas diffusion layer having the catalyst precursor layer formed thereon is joined to the polymer electrolyte membrane surface, a carbon support such as carbon particles and carbon fibers or a resin sheet having the carbon support present in the form of a layer on the surface thereof may be used as the gas diffusion layer. The carbon support may be also present on the surface of carbon cloth or carbon paper.

In a case where the catalyst precursor layer is formed on the polymer electrolyte membrane surface, rather than on the substrate surface, the aforementioned process of transferring or joining the catalyst precursor layer to the polymer electrolyte membrane surface is unnecessary.

In the process (1), an Si compound including Si, —OH bound to the Si or a group that is bound to the Si and becomes —OH upon hydrolysis, and a hydrophobic group is attached to the catalyst precursor layer.

The Si compound in accordance with the present invention has Si, —OH bound to the Si or a group that is bound to the Si and becomes —OH upon hydrolysis, and a hydrophobic group.

—OH in a case where the Si compound has Si—OH (in other words, has —OH bound to Si) or —OH of the Si—OH formed by hydrolysis is polymerized by a dehydration condensation reaction occurring between the —OH groups, and a siloxane polymer (sometimes referred to hereinbelow as "hydrophobizing agent") having a skeleton in which the hydrophobic group, Si, and O are alternately bound (siloxane skeleton) is formed on the catalyst precursor surface.

In a case where the Si compound has a group that is bound to Si and becomes —OH upon hydrolysis, the group that is bound to Si and becomes —OH upon hydrolysis is hydrolyzed and becomes —OH in a process in which an acid contained in the proton conductive polymer electrolyte, platinum oxide of the catalyst precursor layer, or Pt contained in the platinum oxide serves as a catalyst.

Examples of the group that is bound to Si and becomes —OH upon hydrolysis include —H, —OR (R: an alkyl group having 1 to 6 atoms), and —Cl.

Examples of the hydrophobic group include an alkyl group and a fluoroalkyl group. The alkyl group in this case may have a branched carbon chain or may have a double bond.

Such an Si compound may be a monomer, an oligomer, or a polymer, provided that it has Si, —OH bound to the Si or a group that is bound to the Si and becomes —OH upon hydrolysis, and a hydrophobic group. Therefore, it may be a siloxane polymer or an alkylsilane having the above-described groups. Specific examples of the Si compound include 2,4,6,8-tetraalkylcyclotetrasiloxane, 1,1,1,3,3,3-hexaalkyldisilazane, monoalkylsilane, dialkylsilane, trialkylsilane, polyalkylhydrodienesiloxane, 2,4,6,8-tetraalkyltetraalkoxycyclotetrasiloxane, monoalkyltrialkoxysilane, dialkyldialkoxysilane, trialkylmonoalkoxysilane, polyalkylalkoxysiloxane, 2,4,6,8-tetraalkyltetrachlorocyclotetrasiloxane, monoalkyltrichlorosilane, dialkyldichlorosilane, trialkylmonochlorosilane, and polyalkylchlorosiloxane. The alkyl group in these compounds may be a fluoroalkyl group obtained by substituting some or all H atoms with F atoms.

The Si compound can be attached to the surface of the catalyst precursor layer by a well-known method, for example, a method by which the catalyst precursor layer is immersed in a solution of the Si compound, a method by which the solution is coated on the catalyst precursor layer by dropping, brush coating, spraying, or the like, a method using spraying, spin coating, or dip coating, and a CVD method (Japanese Patent Laid-Open No. 2006-332041, JP-T-1999-510643, and Japanese Patent Laid-Open No. 2006-164575).

Furthermore, it is preferred that the Si compound that has Si, —OH bound to the Si or a group that is bound to the Si and becomes —OH upon hydrolysis, and a hydrophobic group be attached in an amount such that an Si/Pt molar ratio becomes 0.1-0.25.

This is because where the amount attached is too small, hydrophobicity inside the pores of the catalyst layer decreases and the catalyst layer can be easily flooded, and where the amount attached is too large, the reaction surface area of the catalyst becomes small and the catalyst utilization efficiency decreases.

In a case where CVD is carried out at room temperature by setting an Si/Pt molar ratio to 0.1 to 0.25 and using 2,4,6,8-tetramethylcyclotetrasiloxane as a starting material gas, as described in Japanese Patent Laid-Open No. 2006-332041, it is preferred that a contact time of the catalyst precursor layer composed of platinum oxide and the starting material gas be 3 to 5 min.

The process (2) will be described below.

In the process (2), a mixture including a metal compound having a metal atom and —OH bound to the metal atom or a group that is bound to the metal atom and becomes —OH upon hydrolysis and a proton conductive polymer electrolyte is attached to the surface of the catalyst precursor layer to which the Si compound has been attached and which was obtained in the process (1).

As in the case of the Si compound, the —OH bound to a metal atom or OH that has been formed by hydrolysis and is bound to the metal atom is bound to —OH of the Si compound attached to the surface of the catalyst precursor layer or the siloxane polymer formed on the surface of the catalyst precursor layer by a dehydration condensation reaction occurring between the —OH groups. The preferred examples of the metal atom include Al, Si, Ti, Zr, W, Nb, and Ta. The metal compound may be configured by compounds of a plurality of types that have different metal atoms. Examples of the group that is bound to the metal atom and becomes —OH upon hydrolysis include —H, —OR (R: an alkyl group having 1 to 6 atoms), and —Cl.

The metal compound may be a monomer, an oligomer, or a polymer. Because silicon with a β-tin structure is a metal, an Si compound can be used as the metal compound.

In a case where the metal compound is a monomer and has —OH bound to the metal atom, the —OH groups bound to metal atoms are polymerized with each other by a dehydration condensation reaction in the mixture, and a metalloxane polymer is formed that has metalloxane bonds in which the metal atoms and O are alternately bound as a skeleton. Where the metal compound is a monomer and has a group that will become —OH upon hydrolysis, the group that will become —OH upon hydrolysis is hydrolyzed and becomes —OH in a process in which an acid contained in the proton conductive polymer electrolyte, platinum oxide of the catalyst precursor layer, or Pt contained in the platinum oxide serves as a catalyst. Further, the —OH are polymerized by a dehydration condensation reaction and a metalloxane polymer having metalloxane bonds as a skeleton is formed.

Furthermore, where the metal compound is a polymer, the polymer is a metalloxane polymer having a metalloxane bond as a skeleton. In a case where the metal compound is an oligomer, —OH of the oligomer that are bound to the metal atom or —OH that have been formed by hydrolysis and are bound to the metal atom are bound to each other and a metalloxane polymer having metalloxane bonds as a skeleton is obtained.

The metalloxane polymer or the formed metalloxane polymer and the siloxane polymer formed from the above-described Si compound are bound by dehydration condensation of —OH of the two. Here, bonding of the metalloxane polymer and siloxane polymer is described. However, a polymer may be formed by bonding the metal compound and the Si compound, a polymer may be formed by bonding the metal compound and the siloxane polymer, and a polymer may be formed by bonding the metalloxane polymer formed from the metal compound and the Si compound.

After the proton conductive polymer electrolyte and metal compound have been mixed and the adhesion of the proton conductive polymer electrolyte that can hardly be washed away by the generated water and the metal compound has been improved, the Si compound or the siloxane polymer formed from the Si compound is bound to the metal compound, thereby preventing the siloxane polymer from being washed away from the catalyst structural body (structural body obtained by reduction of the catalyst precursor).

When the mixture is prepared, it is preferred that a metal compound solution be prepared and the metal compound solution and the proton conductive polymer electrolyte solution be mixed to prepare the mixture (preferably a liquid mixture).

The metal compound solution can be prepared by using a typical sol-gel process. Thus, an alkoxide or acetylacetonate of the metal and, if necessary, water and a catalyst (an acid or the like) are added to a solvent such as IPA (isopropyl alcohol) and stirred to prepare the solution. In this case, the concentration of the metal compound is not particularly limited, but from the standpoint of solution handleability, the concentration of 5 wt. % to 15 wt. % is preferred.

The prepared metal compound solution is mixed with the proton conductive polymer electrolyte solution to prepare a mixture that is stirred. In this case, the metal compound is mixed at a concentration within a range in which the metal compound can be dispersed in the mixture. For example, in a case where a siloxane is used as the metal compound, the preferred concentration is equal to or less than 4.0 wt. %.

When the mixture is prepared, it is preferred that the preparation involve a process of mixing the metal compound solution and the proton conductive polymer electrolyte solution and preparing a solution including the metal compound and having a concentration of the proton conductive polymer electrolyte of 5.0-20 wt. % and a process of diluting the solution.

During the dilution, it is preferred that dilution be carried out to a concentration at which the proton conductive polymer electrolyte be uniformly dispersed in the catalyst, more specifically, to a concentration of 0.5 wt. % to 3.0 wt. %.

Examples of the proton conductive polymer electrolyte include perfluorocarbon polymers having a sulfonate group, such as NAFION™ (Du Pont Co.), sulfonate or phosphated aromatic polyether ketones, and polysulfones.

As for the weight ratio of the proton conductive polymer electrolyte contained in the mixture and Pt contained in the catalyst precursor, the concentration of the mixture and the amount thereof attached to the catalyst precursor layer are preferably adjusted to obtain a ratio of the proton conductive polymer electrolyte to Pt contained in the catalyst precursor of 6.0 wt. % to 8.0 wt. %.

The prepared mixture is attached to the catalyst precursor layer to which the Si compound has been attached.

Blow drying is preferably performed after the mixture has been attached to the surface of the catalyst structural body.

The process (3) will be described below.

In the process (3), the catalyst precursor layer to which the mixture has been attached in the process (2) is reduced.

Reduction with hydrogen gas, reduction with a solution, or electrochemical reduction may be used for reducing the catalyst precursor layer to which the mixture has been attached. According to the first aspect of the present invention, the reduction is performed after the mixture including a proton conductive polymer electrolyte is attached. As a result, the catalyst structural body of the catalyst layer obtained after the reduction easily maintains the shape similar to that of the catalyst precursor layer.

Figure 3:
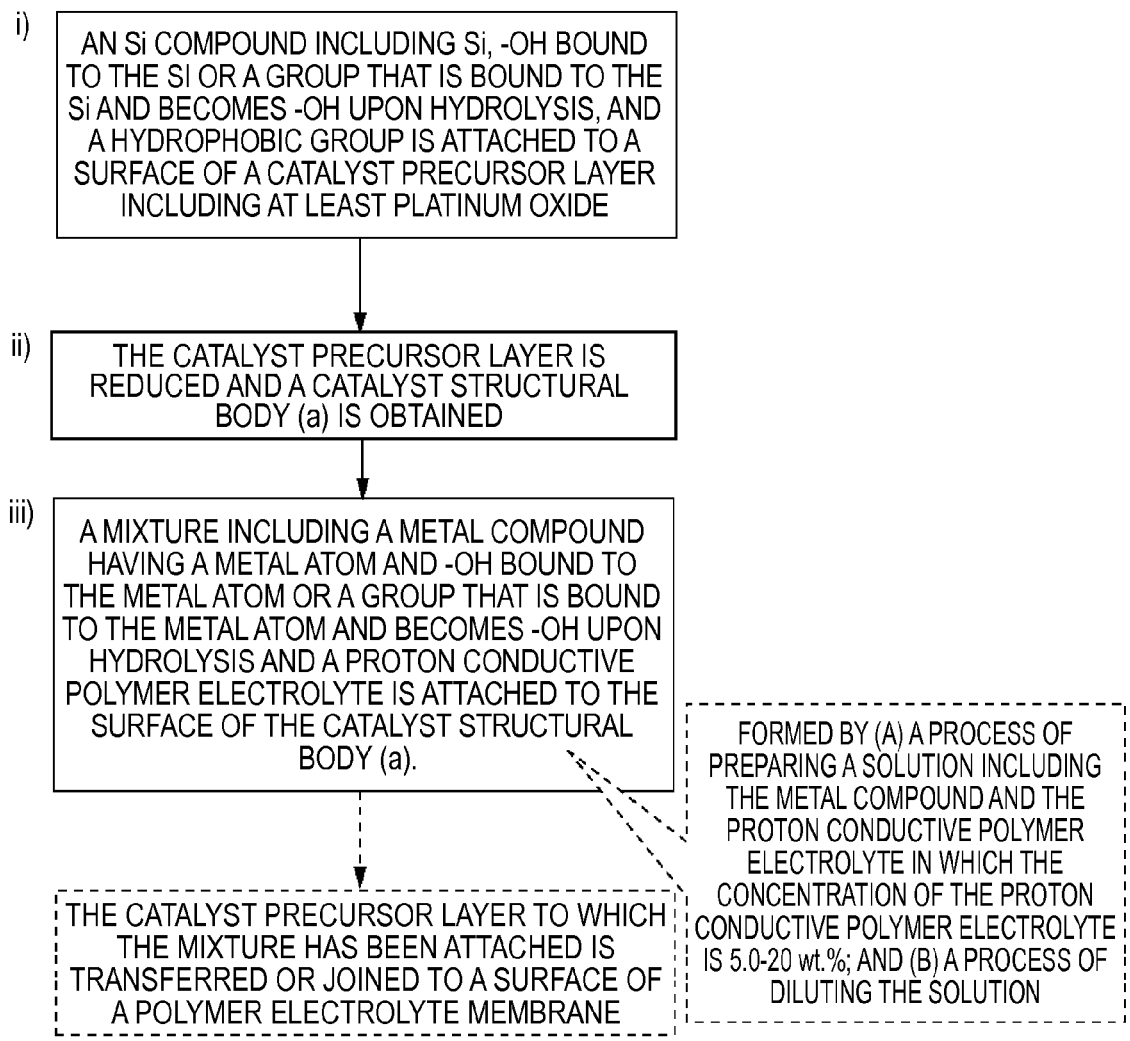
FIG. 3 is a flowchart illustrating the second aspect of the present invention.

The second aspect of the present invention will be described below. A flowchart illustrating the second aspect of the present invention is shown in FIG. 3.

The second aspect of the present invention relates to a method for manufacturing a catalyst layer, including the processes of:

(i) attaching an Si compound including Si, —OH bound to the Si or a group that is bound to the Si and becomes —OH upon hydrolysis, and a hydrophobic group to a surface of a catalyst precursor layer including at least platinum oxide;

(ii) reducing the catalyst precursor layer and obtaining a catalyst structural body (a); and (iii) attaching a mixture including a metal compound having an atom of any one from among Al, Si, Ti, Zr, W, Nb, and Ta and —OH bound to the atom or a group that is bound to the atom and becomes —OH upon hydrolysis and a proton conductive polymer electrolyte to the surface of the catalyst structural body (a).

The second aspect of the present invention is similar to the first aspect of the present invention, except that the order of processes (2) and (3) of the first aspect of the present invention is changed.

In a case where the membrane electrode assembly is formed by transferring or joining the catalyst layer to the polymer electrolyte membrane surface, it is preferred that the transferring or joining be performed after the process (iii).

The mixture of the process (iii) is preferably formed by
(A) a process of preparing a solution including the metal compound and the proton conductive polymer electrolyte in which the concentration of the proton conductive polymer electrolyte is 5.0-20 wt. %; and
(B) a process of diluting the solution. During the dilution, it is preferred that dilution be carried out to a concentration at which the proton conductive polymer electrolyte be uniformly dispersed in the catalyst, more specifically, to a concentration of 0.5 wt. % to 3.0 wt. %.

A coating layer composed of a fluoropolymer may be formed on the catalyst layer obtained by the manufacturing method according to the first and second aspect of the present invention. In such a case, the fluoropolymer is preferably a layer that covers 90% or more of the surface area of the obtained catalyst layer.

EXAMPLES

The present invention will be described below in greater detail with reference to specific examples.

Example 1

Figure 4:
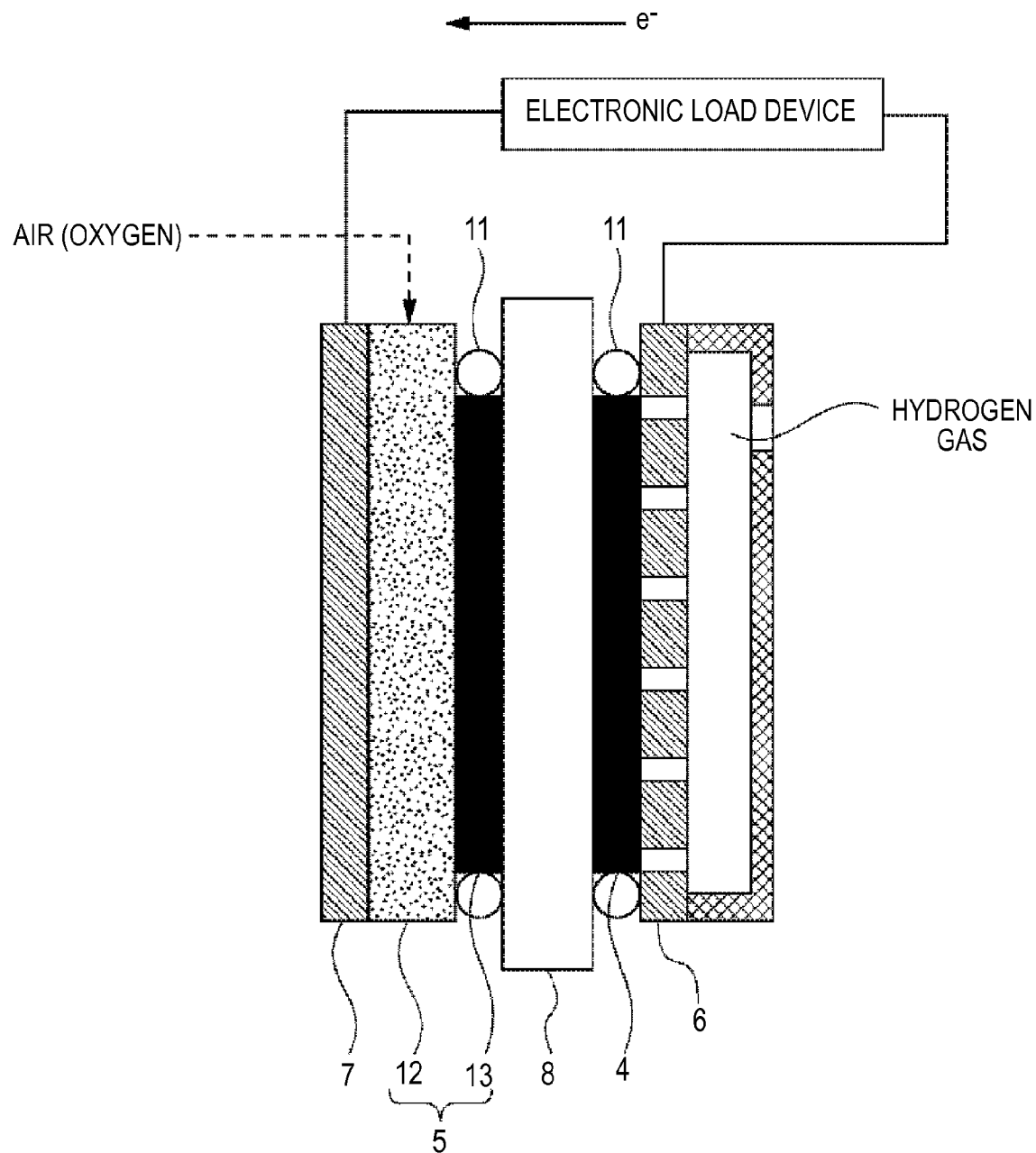
FIG. 4 is a schematic diagram illustrating a device for evaluating fuel cell units of Examples 1 to 8 and Comparative Example 1.

In the present example, a solid polymer fuel cell having a configuration shown in FIG. 4 was produced using the method for manufacturing a catalyst layer according to the second aspect of the present invention illustrated by FIG. 3.

The manufacturing processes will be described below in greater detail.

(Process 1)

First, a catalyst precursor layer was formed.

A PtOx layer that was a catalyst precursor layer was formed to a thickness of 2 μm by a RF reactive sputtering method using a Pt (4N) target on the surface of a PTFE sheet (NITOFLON™, manufactured by Nitto Denko Corp.; can be referred to hereinbelow as "substrate"). CS-200 by ULVAC Corp. was used as the reactive sputtering apparatus. In this case, the reactive sputtering was carried out under a total pressure of 5 Pa, 100% oxygen gas, and a substrate heater temperature of 40° C. More specifically, the sputtering was carried out under the following conditions: the RF (high frequency of 13.56 MHz) power supplied to the Pt target was 5.4 W/cm$^2$.

(Process 2)

An Si compound was attached to the PtOx layer surface and a hydrophobizing agent composed of a siloxane polymer was formed thereon according to the well-known technology described in Japanese Patent Laid-Open No. 2006-332041. Thus, the catalyst precursor layer obtained in Process 1 was treated for 4 min with vapors of 2,4,6,8-tetramethyltetracyclosiloxane at room temperature (vapor pressure about 1.2 kPa) in a sealed container to form an appropriate amount of the hydrophobizing agent on the PtOx surface. An Si/Pt molar ratio in the catalyst precursor was 0.10.

(Process 3)

A reduction treatment was then performed by exposing the obtained PtOx layer to a 2% $H_2$/He atmosphere for 30 min, and a catalyst structural body (a) having a dendritic shape was obtained on the PTFE sheet surface. The supported amount of Pt was 0.6 mg/cm$^2$.

(Process 4)

A total of 6.2 parts by weight of ethyl silicate (manufactured by Kishida Chemical Co., Ltd.), which is a metal compound, 2.2 parts by weight of water, 0.02 part by weight of diluted hydrochloric acid (0.1 mol/g), and 13.8 parts by weight of IPA were mixed and stirred to produce a siloxane solution, which is a metal compound solution. The siloxane solution was stirred for 2 h at room temperature, then mixed with a 1% NAFION solution (a solution obtained by diluting a 5 wt. % NAFION-dispersed solution produced by SIGMA Aldrich Co. with IPA), which is a proton conductive polymer electrolyte solution, and then stirred for 24 h to obtain a mixed solution. In this case, the mixing was performed so that the amount of siloxane polymer was 4 wt. % the amount of NAFION.

(Process 5)

The mixed solution obtained in Process 4 was dropped on the catalyst structural body (a) obtained in the process (3) at a ratio of 8 μl per 1 cm$^2$ of the catalyst surface area and the solvent was evaporated under vacuum to form a catalyst layer.

(Process 6)

In order to produce an anode catalyst layer, a platinum-supporting carbon layer was formed on the PTFE sheet surface by a doctor blade method to obtain the supported amount of Pt of 0.3 mg/cm$^2$. The catalyst slurry attached to the PTFE sheet surface in this case was obtained by kneading 1 part by weight of platinum-supporting carbon (HiSPEC 4000, produced by Johnson Matthey Co.), 0.07 part by weight of NAFION, 1 part by weight of IPA, and 0.4 part by weight of water.

(Process 7)

A solid polymer electrolyte membrane (NAFION 112, produced by Du Pont Co., thickness 50 μm) was sandwiched between the PTFE sheets having the catalyst layers attached thereto (produced in Process 5 and Process 6) so that the catalyst layers were on the inner side, and hot pressing was carried under the following pressing conditions: 4 MPa, 150° C., and 10 min. The PTFE sheets were then removed by peeling off the PTFE sheets from the anode catalyst layer and cathode catalyst layer, thereby producing a MEA. Thus, a MEA was obtained in which the cathode catalyst layer was the catalyst layer in accordance with the present invention and the anode catalyst layer was a platinum-supporting carbon catalyst layer.

Comparative Example 1

A MEA was produced in the same manner as in Example 1, except that the Process 4 was not implemented. The Si/Pt molar ratio in the catalyst was 0.11. The supported amount of Pt was 0.6 mg/cm$^2$.

Example 2

When the siloxane solution and proton conductive polymer electrolyte solution were mixed in Process 4 of Example 1, the concentration of the proton conductive polymer electrolyte solution was 3%. Dilution with IPA was further performed after mixing and stirring to obtain the concentration of the proton conductive polymer electrolyte solution of 1%. Other processes in the fabrication of a MEA were identical to those of Example 1. The Si/Pt molar ratio in the catalyst layer was 0.10. The supported amount of Pt was 0.6 mg/cm$^2$.

Example 3

When the siloxane solution and proton conductive polymer electrolyte solution were mixed in Process 4 of Example 1, the concentration of the proton conductive polymer electrolyte solution was 5%. Dilution with IPA was further performed after mixing and stirring to obtain the concentration of the proton conductive polymer electrolyte solution of 1%. Other processes in the fabrication of a MEA were identical to those of Example 1. The Si/Pt molar ratio in the catalyst layer was 0.11. The supported amount of Pt was 0.6 mg/cm$^2$.

Example 4

When the siloxane solution and proton conductive polymer electrolyte solution were mixed in Process 4 of Example 1, the concentration of the proton conductive polymer electrolyte solution was 7%. A 20% NAFION-dispersed solution (manufactured by Wako Pure Chemical Industries, Ltd.) diluted to 7% with IPA was used as the proton conductive polymer electrolyte solution with a concentration of 7%. Dilution with IPA was further performed after mixing and stirring to obtain the concentration of the proton conductive polymer electrolyte solution of 1%. Other processes in the fabrication of a MEA were identical to those of Example 1. The Si/Pt molar ratio in the catalyst layer was 0.10. The supported amount of Pt was 0.6 mg/cm$^2$.

Example 5

When the siloxane solution and proton conductive polymer electrolyte solution were mixed in Process 4 of Example 1, the concentration of the proton conductive polymer electrolyte solution was 10%. A 20% NAFION-dispersed solution (manufactured by Wako Pure Chemical Industries, Ltd.) diluted to 10% with IPA was used as the proton conductive polymer electrolyte solution with a concentration of 10%. Dilution with IPA was further performed after mixing and stirring to obtain the concentration of the proton conductive polymer electrolyte solution of 1%. Other processes in the fabrication of a MEA were identical to those of Example 1. The Si/Pt molar ratio in the catalyst layer was 0.10. The supported amount of Pt was 0.6 mg/cm$^2$.

Example 6

When the siloxane solution and proton conductive polymer electrolyte solution were mixed in Process 4 of Example 1, the concentration of the proton conductive polymer electrolyte solution was 15%. A 20% NAFION-dispersed solution (manufactured by Wako Pure Chemical Industries, Ltd.) diluted to 15% with IPA was used as the proton conductive polymer electrolyte solution with a concentration of 15%. Dilution with IPA was further performed after mixing and stirring to obtain the concentration of the proton conductive polymer electrolyte solution of 1%. Other processes in the fabrication of a MEA were identical to those of Example 1. The Si/Pt molar ratio in the catalyst layer was 0.12. The supported amount of Pt was 0.6 mg/cm$^2$.

Example 7

When the siloxane solution and proton conductive polymer electrolyte solution were mixed in Process 4 of Example 1, the concentration of the proton conductive polymer electrolyte solution was 20%. A 20% NAFION-dispersed solution (manufactured by Wako Pure Chemical Industries, Ltd.) was used as the proton conductive polymer electrolyte solution with a concentration of 20%. Dilution with IPA was further performed after mixing and stirring to obtain the concentration of the proton conductive polymer electrolyte solution of 1%. Other processes in the fabrication of a MEA were identical to those of Example 1. The Si/Pt molar ratio was 0.13. The supported amount of Pt was 0.6 mg/cm$^2$.

Example 8

In Example 7, the order of the process of reducing the catalyst precursor layer was changed and the catalyst layer was produced according to the procedure of the method for manufacturing the catalyst layer according to the first aspect of the present invention shown in FIG. 2.

Evaluation of Examples 1 to 8 and Comparative Example 1

The MEA of Examples 1 to 8 and Comparative Example 1 were analyzed by X-ray fluorescence analysis (abbreviated hereinbelow as XRF), and the amount of Si that was a constituent element of the hydrophobizing agent was measured. ZSX 1009e (produced by Rigaku KK) was used as the analyzer.

Then, a test was performed in which the MEA were immersed and held for 4 days in warm water at a temperature of 50° C. The MEA were then dried and the amount of Si was again measured by XRF. Because the catalyst layers in the MEA had a history of contact with water for a long time, the outflow amount of the hydrophobizing agent could be measured by comparing the amount of Si in the catalyst layer that was measured before and after the warm water immersion test.

The siloxane polymer was also dispersed in the proton conductive polymer electrolyte, but because the hydrophobizing agent and the siloxane polymer apparently polymerized and integrated in the MEA, it seems to be meaningless to distinguish the hydrophobizing agent and the siloxane polymer in comparing the Si amount before and after the immersion.

The retention ratio of the amount of Si before and after the test in the MEA of Examples 1 to 7 and Comparative Example 1 is shown in Table 1. The retention ratio of the amount of Si was calculated by dividing the amount of Si after the test in each MEA by the amount of Si before the test.

TABLE 1

| | Ionomer concentration during mixing with siloxane solution (wt. %) | Si/Pt, before the text | Si retention ratio after deterioration test (wt. %) |
|---|---|---|---|
| Comparative Example 1 | — | 0.11 | 33% |
| Example 1 | 1 | 0.1 | 59% |
| Example 2 | 3 | 0.1 | 56% |
| Example 3 | 5 | 0.11 | 68% |
| Example 4 | 7 | 0.1 | 67% |
| Example 5 | 10 | 0.1 | 66% |
| Example 6 | 15 | 0.12 | 87% |
| Example 7 | 20 | 0.13 | 93% |

As shown in Table 1, in Comparative Example 1, only ⅓ of Si remained after the test, and the outflow of the hydrophobizing agent occurred. By contrast, in Examples 1 to 7, the amount of remaining Si was larger than that in Comparative Example 1 and the outflow of the hydrophobizing agent was greatly inhibited. It was thus confirmed that by adding the siloxane to the ionomer, it was possible to inhibit the outflow of the hydrophobizing agent. Furthermore, it was found that the higher was the ionomer concentration when the siloxane polymer was added, the higher was the Si retention ratio.

Fuel cell units were then formed by sandwiching the MEA of Example 7 in which the Si retention ratio was the highest (state before the test) and the MEA of Comparative Example 1 in which the ratio was the lowest (state before the test), as MEA 8, between the anode-side gas diffusion layer 4, cathode-side gas diffusion layer 5, anode-side collector 6, and cathode-side collector 7 in the order shown in FIG. 4. A gas diffusion layer composed of a carbon cloth 13 (manufactured by E-TEK Co., LT-1200-W) constituted by MPL and a sub-layer and a foamed metal 12 was used as the cathode-side gas diffusion layer 5. The carbon cloth 13 used for the cathode-side gas diffusion layer 5 was also used for the anode-side gas diffusion layer 4. A slit was provided in the anode-side collector 6 to enable free passage of hydrogen gas.

The fuel cell units were also produced in the same manner by using the MEA of Example 7 and Comparative Example 1 after the warm water immersion test.

The circumference of the gas diffusion layers 4 and 5 was sealed with an O ring 11. An electronic load device and a hydrogen gas piping were connected, as shown in FIG. 4, to each fuel cell unit, a current sweep test of the fuel cells was carried out, and a power generation characteristic was evaluated. The anode-side collector 6 was filled with the hydrogen gas at 0.15 MPa at the dead end, and the cathode-side collector 7 was open to air. The power generation characteristic was evaluated at a cell temperature of 25° C. and a relative humidity of the ambient environment of 100%. The current sweep rate was 1 $mA/cm^2$/sec.

Under such conditions, the anode side is a dead end. Therefore, moisture evaporation from the anode side is inhibited. Furthermore, because the air humidity at the cathode side is 100% RH, a state is assumed in which moisture evaporation from the cathode side is small. Thus, under these conditions, moisture movement to the outside of the cell is inhibited. Therefore, flooding in the cathode catalyst layer easily occurs. Moreover, flooding in the catalyst layer easily occurs at a high current density because the sweep rate of electric current value during measurements is small, the power generation time during measurements is accordingly long, and a large amount of water is generated. Where cell power generation characteristics obtained with the MEA of Example 7 and Comparative Example 1 under such conditions that easily cause flooding are compared, the difference in physical diffusion ability between the cathode catalyst layers in each MEA becomes significant and is reflected in the power generation characteristic. Therefore, the effect of hydrophobizing agent outflow on the power generation characteristic is easily determined.

Figure 5:
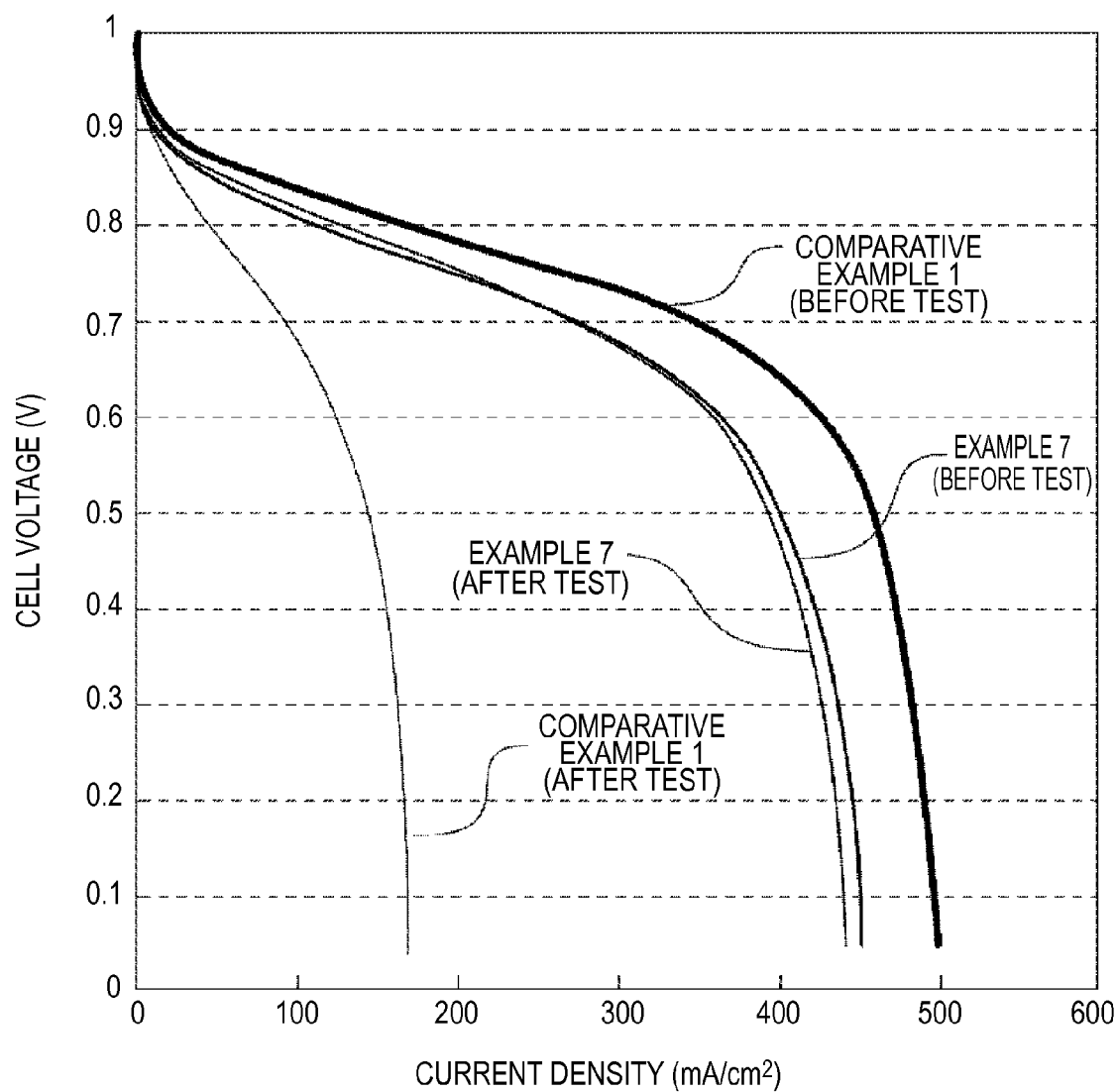
FIG. 5 illustrates a voltage—current density characteristic of fuel cell units of Example 7 and Comparative Example 1.

FIG. 5 shows the results relating to a voltage—current density characteristic of each cell. Although the current density prior to the test in Example 7 at 0.4 V was 420 $mA/cm^2$ and was less than that in Comparative Example 1 (475 $mA/cm^2$), the current density in Example 7 after the test was 413 $mA/cm^2$ and larger than that in Comparative Example 1 (157 $mA/cm^2$).

This is supposedly because in the MEA of Example 7, 93% the hydrophobizing agent remained even after the test and, therefore, a sufficient amount of the hydrophobizing agent of the catalyst layer was retained. In Comparative Example 1, ⅔ of the hydrophobizing agent flowed out due to the immersion test. This is supposedly why the hydrophobicity of the catalyst layer decreased and flooding easily occurred.

Comparing the difference in the current density at 0.4 V between the states before and after the test, in Comparative Example 1, the difference was 318 $mA/cm^2$, whereas in Example 7, the difference was 7 $mA/cm^2$ and, therefore, the deterioration of power generation characteristic caused by the immersion test was greatly inhibited.

The results obtained with the catalyst layer produced in Example 8 were similar to those obtained in Example 7.

The present invention can provide a method for manufacturing a catalyst layer in which outflow of the hydrophobizing agent present on the catalyst layer surface is prevented and which has good water resistance over a long period, and a method for manufacturing a membrane electrode assembly.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-135690, filed May 23, 2008, which is hereby incorporated by reference herein in its entirety.

What is claimed is:

1. A method for manufacturing a catalyst layer, comprising the processes of:
   (1) attaching an Si compound comprising Si, —OH bound to the Si or a group that is bound to the Si and becomes —OH upon hydrolysis, and a hydrophobic group to a surface of a catalyst precursor layer comprising at least platinum oxide;
   (2) reacting a mixture comprising a metal compound having a metal atom and —OH bound to the metal atom or a group that is bound to the metal atom and becomes —OH upon hydrolysis and a proton conductive polymer electrolyte, with the Si compound that has been attached to the surface of the catalyst precursor layer; and
   (3) reducing the catalyst precursor layer to which the mixture has been reacted.

2. The method for manufacturing a catalyst layer according to claim 1, wherein the metal compound is a metalloxane polymer.

3. The method for manufacturing a catalyst layer according to claim 1, wherein
   the mixture of the process (2) is formed by
   (I) a process of preparing a solution comprising the metal compound and the proton conductive polymer electrolyte in which the concentration of the proton conductive polymer electrolyte is 5.0-20 wt. %; and
   (II) a process of diluting the solution.

4. A method for manufacturing a membrane electrode assembly comprising, in addition to the processes (1) to (3) according to claim 1,
   a process of transferring or joining the catalyst precursor layer to which the mixture has been attached to a surface of a polymer electrolyte membrane after the process (2) and before the process (3), or after the process (3).

5. A method for manufacturing a catalyst layer, comprising the processes of:
   (i) attaching an Si compound comprising Si, —OH bound to the Si or a group that is bound to the Si and becomes —OH upon hydrolysis, and a hydrophobic group to a surface of a catalyst precursor layer comprising at least platinum oxide;
   (ii) reducing the catalyst precursor layer and obtaining a catalyst structural body (a); and
   (iii) reacting a mixture comprising a metal compound having a metal atom and —OH bound to the metal atom or a group that is bound to the metal atom and becomes —OH upon hydrolysis and a proton conductive polymer electrolyte, with the Si compound attached to the surface of the catalyst structural body (a).

6. The method for manufacturing a catalyst layer according to claim 5, wherein the metal compound is a metalloxane polymer.

7. The method for manufacturing a catalyst layer according to claim 5, wherein
the mixture of the process (iii) is formed by
(A) a process of preparing a solution comprising the metal compound and the proton conductive polymer electrolyte in which the concentration of the proton conductive polymer electrolyte is 5.0-20 wt. %; and
(B) a process of diluting the solution.

8. A method for manufacturing a membrane electrode assembly comprising, in addition to the processes (i) to (iii) according to claim 5,
a process of transferring or joining the catalyst precursor layer to which the mixture has been attached to a surface of a polymer electrolyte membrane after the process (iii).

9. A method for manufacturing a catalyst layer according to claim 1, wherein the mixture comprises the proton conductive polymer electrolyte in a concentration of 0.5 wt. % to 3.0 wt. %.

* * * * *